(12) United States Patent
Sasada et al.

(10) Patent No.: US 9,547,135 B2
(45) Date of Patent: Jan. 17, 2017

(54) CONNECTOR AND ELECTRONIC DEVICE USING THE CONNECTOR

(71) Applicant: Hosiden Corporation, Yao-shi (JP)

(72) Inventors: Kosuke Sasada, Yao (JP); Takayuki Nagata, Yao (JP)

(73) Assignee: Hosiden Corporation, Osaka (JP)

( * ) Notice: Subject to any disclaimer, the term of this patent is extended or adjusted under 35 U.S.C. 154(b) by 0 days.

(21) Appl. No.: 14/682,469

(22) Filed: Apr. 9, 2015

(65) Prior Publication Data

US 2015/0331203 A1 Nov. 19, 2015

(30) Foreign Application Priority Data

May 13, 2014 (JP) .................................. 2014-099697

(51) Int. Cl.
| | |
|---|---|
| *G02B 6/42* | (2006.01) |
| *H01R 12/70* | (2011.01) |
| *H01R 12/71* | (2011.01) |
| *G02B 6/38* | (2006.01) |
| *H01R 12/83* | (2011.01) |
| *H01R 13/64* | (2006.01) |

(52) U.S. Cl.
CPC .............. *G02B 6/42* (2013.01); *G02B 6/4284* (2013.01); *H01R 12/7029* (2013.01); *H01R 12/716* (2013.01); *G02B 6/3895* (2013.01); *H01R 12/83* (2013.01); *H01R 13/64* (2013.01)

(58) Field of Classification Search
CPC ... G06F 1/1632; G02B 6/4292; G02B 6/4246; G02B 6/4278; G02B 6/3897; G02B 6/4257; G02B 6/426; G02B 6/4284
See application file for complete search history.

(56) References Cited

U.S. PATENT DOCUMENTS

| | | | | |
|---|---|---|---|---|
| 6,126,325 A * | 10/2000 | Yamane | ............... | G02B 6/4292 385/70 |
| 6,840,685 B1 * | 1/2005 | Kuba | ................... | G02B 6/4292 385/88 |
| 2003/0152326 A1 * | 8/2003 | Morimoto | .............. | G02B 6/266 385/34 |
| 2004/0120660 A1 * | 6/2004 | Go | ....................... | G02B 6/4246 385/92 |
| 2004/0184744 A1 * | 9/2004 | Uekawa | ............... | G02B 6/3636 385/93 |
| 2005/0180754 A1 * | 8/2005 | Mizue | .................. | G02B 6/4246 398/135 |
| 2013/0051738 A1 * | 2/2013 | Ito | ........................ | H05K 9/0018 385/92 |
| 2013/0108224 A1 | 5/2013 | Ishigami et al. | | |

FOREIGN PATENT DOCUMENTS

JP          201397225 A       5/2013

* cited by examiner

*Primary Examiner* — Thomas A Hollweg
*Assistant Examiner* — Mary A El Shammaa
(74) *Attorney, Agent, or Firm* — The Webb Law Firm

(57) ABSTRACT

A transmission connector includes a transmission optical module having a signal electrode inputting/outputting an electric signal and a transmission receptacle having a contact to be electrically connected to the signal electrode when fitted to the transmission optical module. The transmission modules includes a second cutout for preventing erroneous fitting to a reception receptacle. The transmission receptacle includes a first projection for preventing erroneous fitting to a reception optical module.

12 Claims, 9 Drawing Sheets

CONNECTOR AND ELECTRONIC DEVICE USING THE CONNECTOR

CROSS REFERENCE TO RELATED APPLICATION

This application is based on and claims priority under 35 U.S.C. Section 119 to Japanese Patent Application No. 2014-099697 filed on May 13, 2014, the entire contents of which are incorporated herein by reference.

TECHNICAL FIELD

This disclosure relates to a connector and an electronic device using the connector.

RELATED ART

In recent years, due to popularization of internet and improvement in the information processing ability of computers, there is a need for improvement in transmission speed of signals transmitted between or in various information processing devices such as a server, a storage. Conventionally, for such communication, electric communication using coaxial cables has been employed. However, as it is difficult for such electric communication using coaxial cables to cope with the increasing transmission speed in future, optical communication using optical fibers is gaining expectation as an alternative thereto. Compared with coaxial cable, optical fiber not only enables high speed transmission, but provides advantages of being light-weight and having small bending radius, as well as superior EMI (Electro-Magnetic Interference) resistance.

For implementing optical communication between devices, there is generally employed an active optical cable including an optical module having a photoelectric transducer attached to an end of the optical cable. On the side of the device, there is employed a receptacle to be fitted to the module. With this, on the device side, input and output of electric signals are made possible via the receptacle as implemented conventionally. Thus, change from the coaxial cable can be easily made.

Japanese Unexamined Patent Application Publication No. 2013-097225 discloses an optical module which is formed smaller in its thickness direction and which can be readily assembled as well as a signal transmission medium using this optical module. The above optical module includes a photoelectric transducer element to be optically connected to an optical cable and a plate-like substrate mounting the photoelectric transducer element. The substrate includes, along its one side, a card edge connector portion forming a plurality of electric contacts. As this card edge connector is inserted to a connector mounted on an electronic circuit board, electric signals are inputted and outputted between the optical module and the electronic circuit board.

SUMMARY

As the active optical cable, there are two types, one being designed to allow bidirectional communication and the other designed to allow only one-directional communication. In the case of the bidirectional communication type, both optical modules attached to opposed ends of the optical cable include a light projecting element and a light receiving element, so that each optical module provides both a transmission function and a reception function. On the other hand, in the case of the one-directional communication type, the optical module attached to one end of the optical cable has only a light projecting element, thus providing transmission function alone, whereas the optical module attached to the other end of the optical cable has only a light receiving element, thus providing reception function alone.

In the case of the bidirectional communication type, since the optical modules attached to the opposed ends of the optical cable are of a same configuration, the active optical cable has no directivity. Therefore, no directivity is required for the receptacles to which the optical modules are to be connected. On the other hand, in the case of the one-directional communication type, the optical modules attached to the respective ends of the cable are one having transmission function ("transmission optical module" hereinafter) and one having reception function ("reception optical module" hereinafter) respectively, thus the optical modules of the respective cable ends having the different functions from each other. In this way, the active optical cable has directivity. Accordingly, directivity is required also for the receptacles to be connected to them respectively. Namely, the transmission optical module needs to be connected to a transmission receptacle, whereas the reception optical module needs to be connected to a reception receptacle. The reverse connection is not permitted. If the transmission optical module should be fitted to the reception receptacle or the reception optical module should be fitted to the transmission receptacle erroneously, this would result in not only inability of the active optical cable to operate appropriately, but even damage to driving IC or the projecting/receiving elements in the worst case.

For prevention of such erroneous fitting, it is conceivable e.g. to make the shape of the transmission optical module completely different from that of the reception optical module. In this case, however, there will arise a need to make the shapes of the receptacles to be connected to the respective optical modules also different in accordance therewith. Thus, there may occur significant increase in the total costs of the active optical cable and the receptacles provided at its opposed ends, combined together.

As described above, in the one-directional communication type active optical cable, there remains room for further improvement in the combination of the optical module and receptacles (this combination will be referred to as "connector" hereinafter) for prevention of erroneous fitting.

According to this disclosure, there are disclosed a connector having an arrangement for realizing prevention of erroneous fitting in economical and easy way and an electronic device using this connector.

According to one embodiment of this disclosure, a connector comprises:

a transmission optical module or a reception optical module having a signal electrode inputting/outputting an electric signal;

a transmission receptacle or a reception receptacle having a contact to be electrically connected to the signal electrode when fitted to the transmission optical module or the reception optical module; and an erroneous fitting prevention arrangement provided in each one of the transmission optical module, the reception optical module, the transmission receptacle, and the reception receptacle, the erroneous fitting prevention arrangement preventing erroneous fitting of the transmission optical module and the reception receptacle as well as erroneous fitting of the reception optical module and the transmission receptacle.

With the above-described configuration, erroneous fitting of the transmission optical module and the reception receptacle as well as erroneous fitting of the reception optical module and the transmission receptacle can be prevented, whereby only fitting of proper combination alone will be realized. Consequently, the malfunction which occurs at the time of erroneous fitting can be avoided.

According to one further embodiment of the connector relating to this disclosure, the erroneous fitting prevention arrangement includes a first cutout formed in the transmission optical module, a first projection formed in the transmission receptacle to be fitted in the first cutout when the transmission optical module is fitted to the transmission receptacle, a second cutout formed in the reception optical module, a second projection formed in the reception receptacle to be fitted in the second cutout when the reception optical module is fitted to the reception receptacle.

With the above configuration, only by providing a cutout in the respective optical module and providing a projection in the respective receptacle, the erroneous fitting prevention arrangement can be realized. If erroneous insertion has been made which leads to erroneous fitting, this can be recognized by failure of fitting the projection into the cutout. Thus, the erroneous fitting prevention arrangement can be realized without substantial cost increase of the product.

According to a further embodiment of the connector relating to this disclosure, the first cutout and the second cutout are formed adjacent the signal electrode, and the first projection and the second projection are formed adjacent the contact; and the height of the first and second projections from a mounting face on which these are mounted is greater than a height of a contact point of the contact from the mounting face.

With the above configuration, even when an erroneous insertion has been made, this can be recognized as erroneous fitting before electric connection is established with contact being formed between the signal electrode and the contact. Therefore, it is possible to prevent damage through erroneous power supply to the electronic devices such as the light projecting element, the light receiving element, etc. mounted on the transmission optical module or the reception optical module as a result of erroneous insertion.

According to a still further embodiment of the connector relating to this disclosure, the transmission optical module and the reception optical module have same outer appearances, except for the erroneous fitting prevention arrangement; and the transmission receptacle and the reception receptacle have same outer appearances, except for the erroneous fitting prevention arrangement.

With the above-described configuration, it is possible for the transmission optical module and the reception optical module to use a same production facility and also for the transmission receptacle and the reception receptacle to use a same production facility. Consequently, it becomes possible to provide an economic connector.

According to one embodiment of an electronic device relating to this disclosure, the electric device converts the electric signal into an optical signal and transmits this optical signal, and the electric device also receives the optical signal and converts this optical signal into an electric signal, with using the above-described connector.

With the above-described configuration, high-speed transmission of optical signals can be realized with using an optical fiber in an electronic device or between electronic devices, without erroneous fitting.

DESCRIPTION OF EMBODIMENTS

Figure 1:
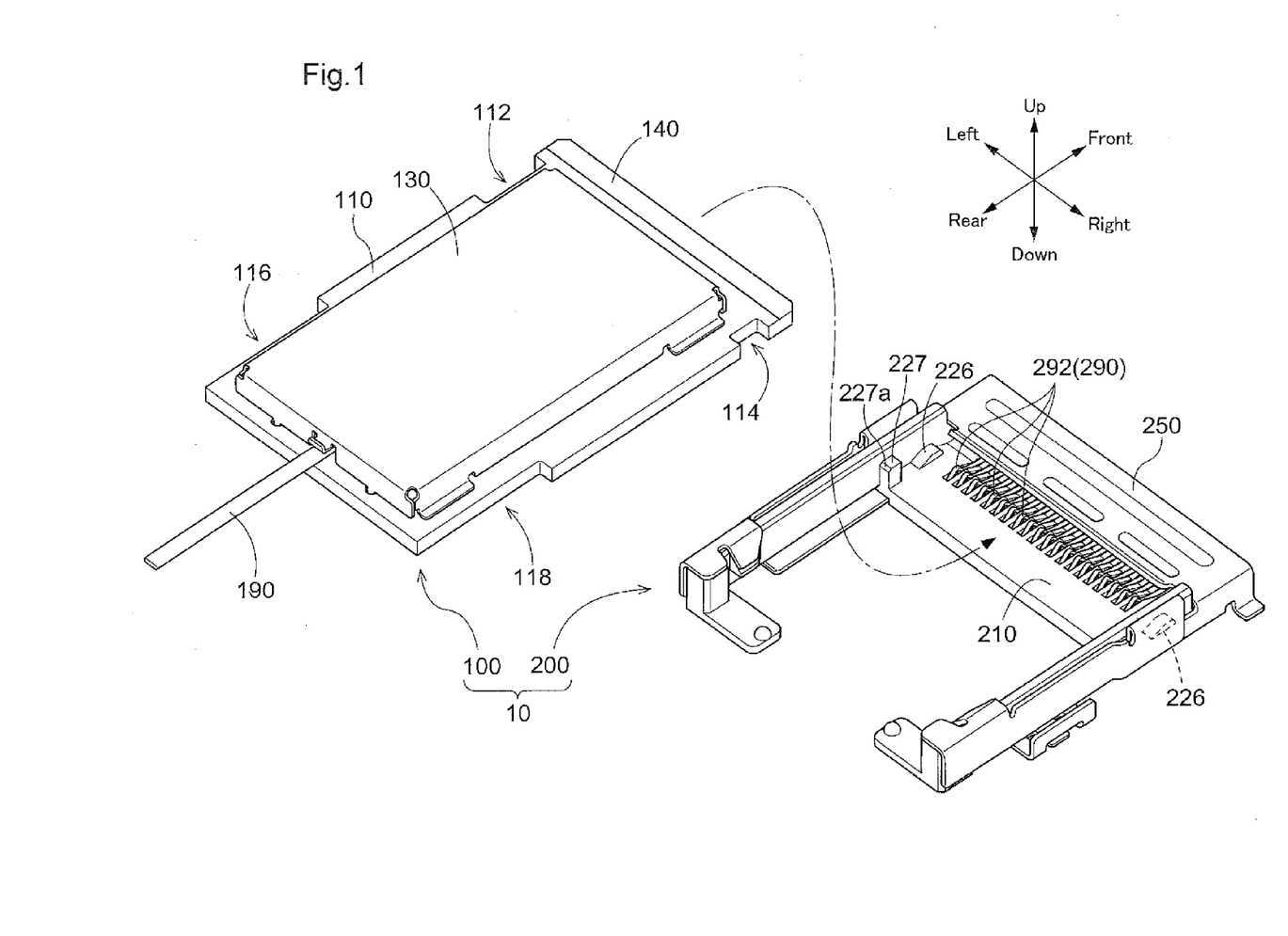
FIG. 1 is a perspective view showing configuration of a transmission optical module and a transmission receptacle together constituting a transmission connector relating to an embodiment.
Figure 2:
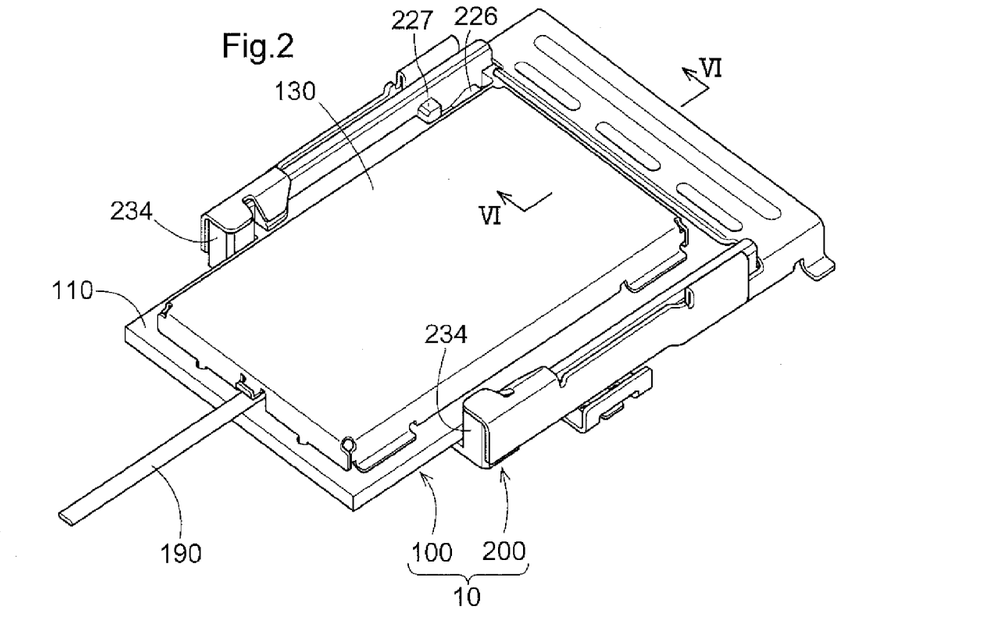
FIG. 2 is a perspective view showing a state wherein the transmission optical module and the transmission receptacle are fitted to each other.

Next, embodiments of this disclosure will be explained with reference to the accompanying drawings. As shown in FIG. 1 and FIG. 2, a transmission connector 10 is comprised of a transmission optical module 100 to which an optical cable 190 comprised of a bundle of optical fibers is connected and a transmission receptor 200 to/from which the transmission optical module 100 is mounted/dismounted.

[Configuration of Transmission Optical Module]

Figure 3:
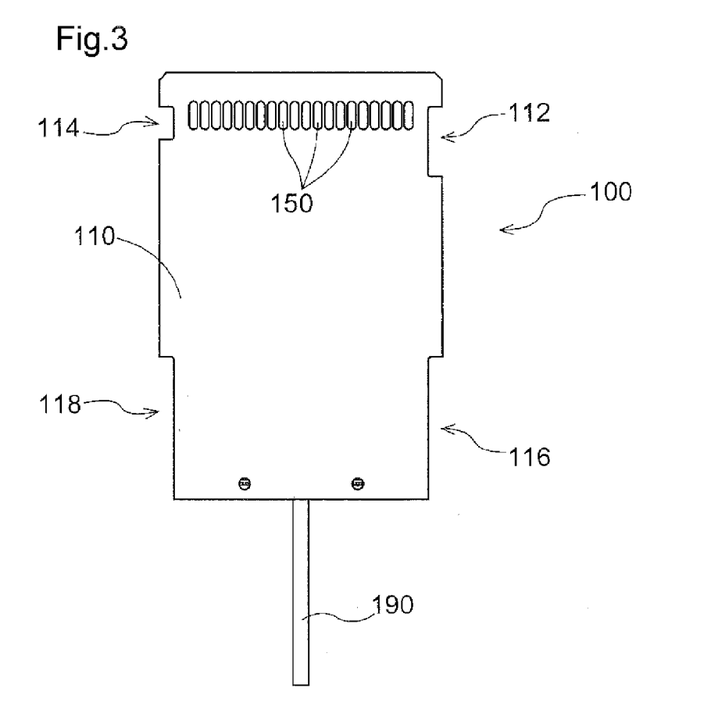
FIG. 3 is a bottom view showing the transmission optical module.

The transmission optical module 100 includes a substrate 110 on which a wiring pattern (not shown) is formed, a light projecting element (not shown) for converting electric signals inputted from the outside into optical signals and emitting these optical signals, a reflecting mirror (not shown) for reflecting emitted optical signals, a driver IC (not shown) for driving the light projecting element, and a cover 130 connected to an upper face of the substrate 110 and covering the light projecting element, the driver IC, etc. At a front end portion of the upper face of the substrate 110, a ground electrode 140 is formed. Further, as shown in FIG. 3, in a lower face of the substrate 110 (the face opposite the face covered by the cover 130), there are formed a plurality of signal electrodes 150 electrically connected to the wiring pattern, thus acting as input/output terminals for electric signals. The arrangement in the transmission optical module 100 for photoelectric conversion of electric signals and causing the optical signals to enter the optical fiber is same as that of the conventional transmission optical module. Therefore, detailed explanation thereof will be omitted herein.

In the following discussion, respecting the directions (orientations) of the transmission optical module 100 and the transmission receptacle 200, as shown in FIG. 1, the side of the transmission optical module 100 on which the ground electrode 140 is formed will be referred to as the front side, the side thereof to which the optical cable 190 is connected will be referred to as the rear side, and the left and right sides as facing the front side will be referred to as the left side and the right side, respectively.

As shown in FIG. 1 and FIG. 3, the substrate 110 includes cutouts at four positions in portions of the left and right sides thereof. At positions slightly rearwardly of the front end of the substrate 110, a first cutout 112 is formed on the left side and a second cutout 114 is formed on the right side, respectively. The first cutout 112 and the second cutout 114 have a same depth (a length in the right/left direction), but the first cutout 112 and the second cutout 114 have different lengths (lengths in the front/rear direction), with the first cutout 112 being cutout by a length longer to the rear side than the second cutout 114. Further, rearwardly of the first cutout 112 and the second cutout 114, a third cutout 116 and a fourth cutout 118 are formed as cutouts of the rear end of the substrate 110. The depth and the length of the third cutout 116 are same as the depth and the length of the fourth cutout 118. Incidentally, the first cutout 112 and the second cutout 114 are an example of what is referred to herein as an "erroneous fitting prevention arrangement".

As shown in FIG. 2, under the state wherein the transmission optical module 100 and the transmission receptacle 200 are fitted to each other (this will be referred to simply as "fitted state" hereinafter), a convex portion 226 and a first projection 227 formed on the left side in the transmission receptacle 200 are fitted in the first cutout 112, whereas a convex portion 226 formed on the right side is fitted in the second cutout 114. This realizes positioning of the transmission optical module 100 and the transmission receptacle 200 relative to each other. Further, under the fitted condition above, in the third cutout 116 and the fourth cutout 118, second pawl portions 234 formed in the transmission receptacle 200 are fitted, thereby to prevent inadvertent displacement and eventual detachment of the transmission optical module 100 to the rear side. The convex portion 226, the first projection 227 and the second pawl portions 234 will be described in greater details later.

[Configuration of Transmission Receptacle]

Figure 4:
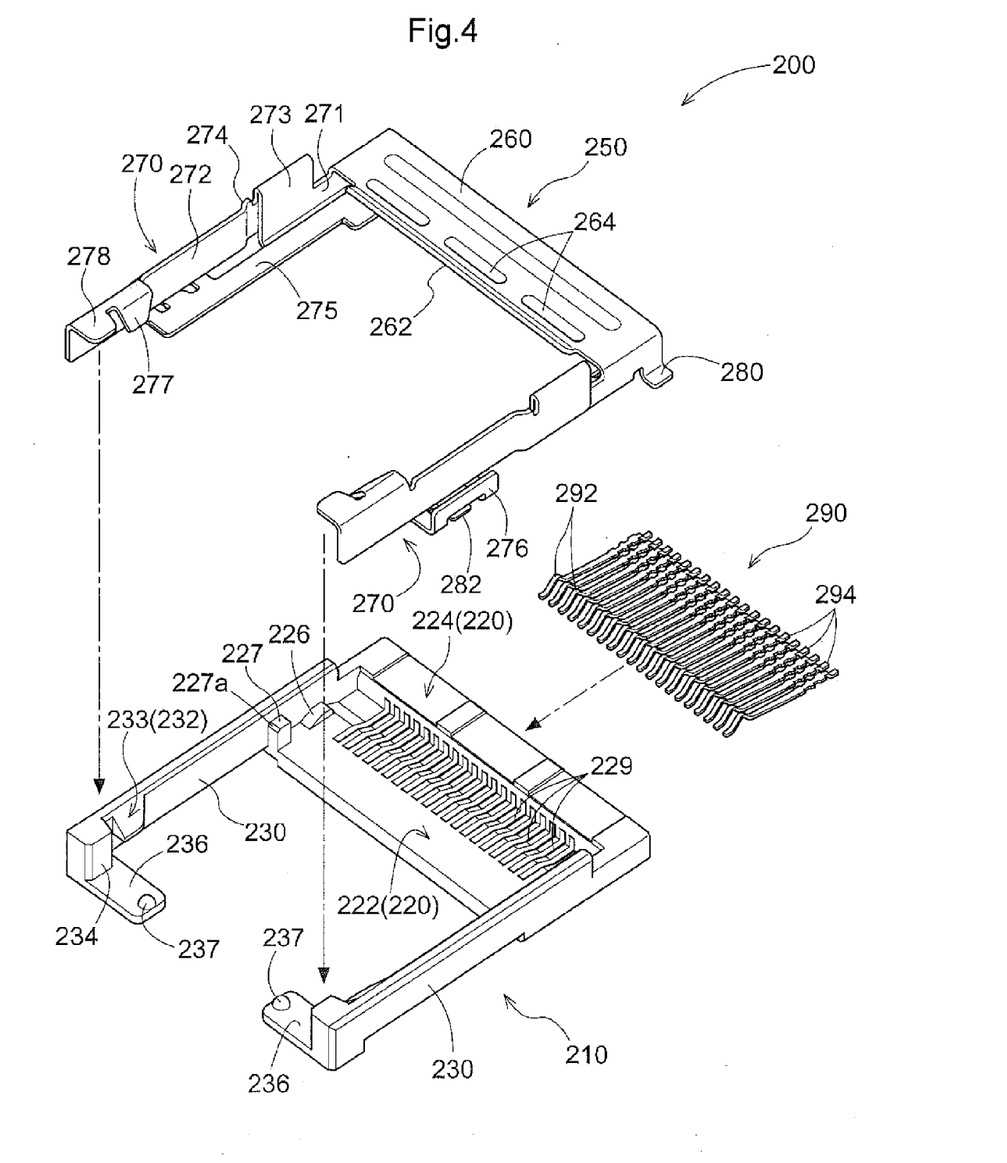
FIG. 4 is an exploded perspective view showing the transmission receptacle, FIG. 5 comprises a section view showing a state in the course of fitting of the transmission optical module to the transmission receptacle and a section view showing a state of completion of the fitting.

As shown in FIG. 1 and FIG. 4, the transmission receptacle 200 includes a main body 210 formed of an insulating material such as resin, a cover body 250 formed of metal such as aluminum and attached to the main body 210 for reinforcing this main body 210, and a plurality of contacts 290 formed of copper alloy such as phosphor bronze, having elasticity, the contacts 290 being pressed into the main body 210 to be held thereto.

The main body 210 includes a base portion 220 and arm portions 230 extending rearwards from opposed ends of the base portion 220.

The base portion 220 includes a mounting face 222 supporting the contacts 290 and receiving the lower face of the transmission optical module 100 coming into contact therewith, and a fixed face 224 located upwardly of the mounting face 222 and receiving the cover body 250 attached and contacted thereto.

At the front end portion of the base portion 200, there are formed a plurality of apertures (not shown) sectioned in correspondence with the individual contacts 290. These apertures are configured as through holes extending from the front end portion of the base portion 220 to the rear side, and contact grooves 229 are formed in the mounting face 222 in continuation from these through holes. As shown in FIG. 1, as the contact grooves 229 guide the left and right sides of the contacts 290, bending of these contacts 290 and accidental contact between adjacent contacts 290 can be prevented.

Each contact 290 includes a contact portion 292 to come into contact with the signal electrode 150 of the transmission optical module 100 to be electrically connected thereto, and a terminal portion 294 to be fixed to a mounting substrate 410 to be described later when the transmission receptacle 200 is mounted on this mounting substrate 410 (see FIG. 10).

The plurality of contacts 290 will be pressed in together from the apertures of the substrate 220 to the rear side, and as shown in FIG. 1, will be juxtaposed in a direction perpendicular to an insertion direction of the transmission optical module 100. In this, the contact portions 292 of the contacts 290 are disposed upwardly of the mounting face 222. Also, the terminal portions 294 extend forwardly from the front end of the base portion 220 and end faces thereof will be bent to be located slightly downwardly of the lower face of the main body 210, thus forming gull wing type terminals. The terminal portions 294 are fixed to the mounting substrate 410 by e.g. soldering and electrically connected to the wiring pattern formed on this mounting substrate 410. With this, electric connection is established between the transmission optical module 100 and the mounting substrate 410.

Figure 6:
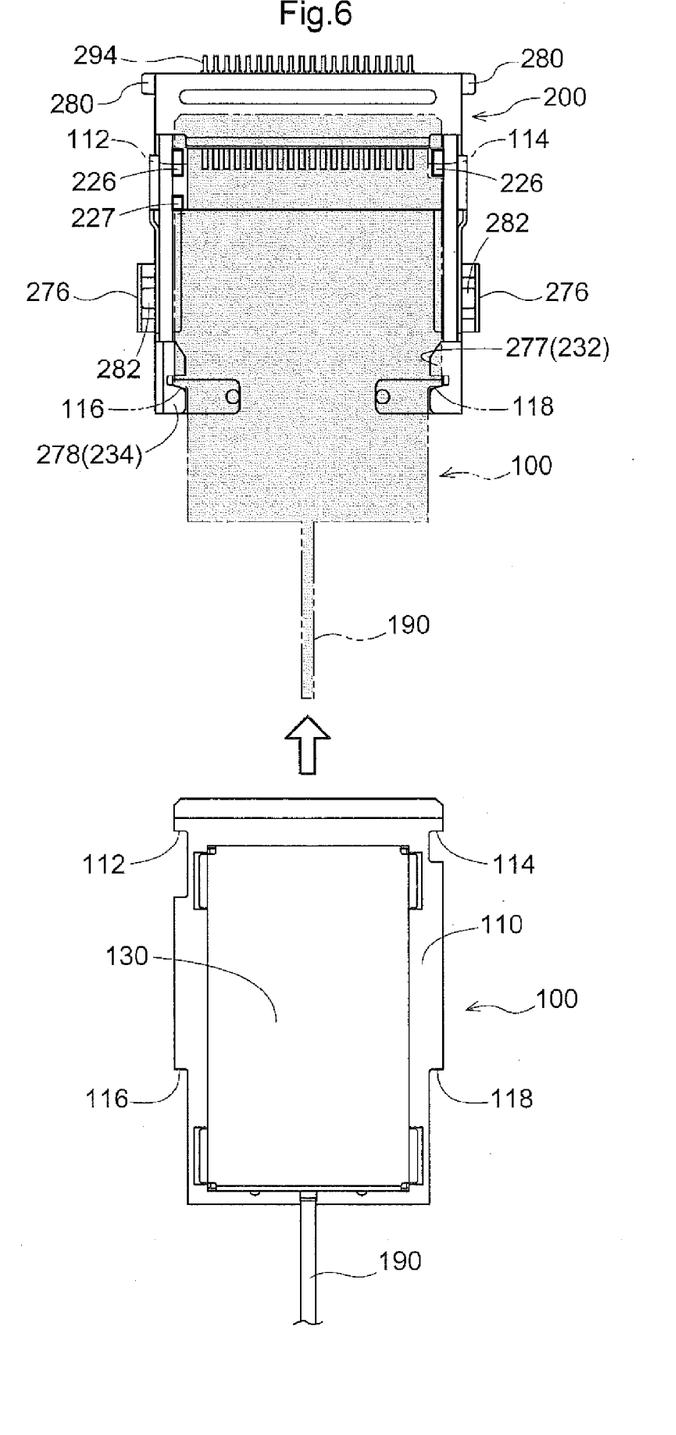
FIG. 6 is a plan view showing positional relation of a convex portion and a first projection relative respectively to a first cutout, as well as positional relation of another convex portion relative to a second cutout, when the transmission optical module has been fitted to the transmission receptacle.

As shown in FIG. 4 and FIG. 6, at opposed ends of the mounting face 222 of the base portion 220, there are formed a pair of convex portions 226 projecting upward across the contacts 290 therebetween. The height of the convex portions 226 from the mounting face 222 is set to be greater than the projecting height of the contact portions 292 of the pressed-in contacts 290, from the mounting face 222. With this arrangement, it is possible to avoid collision of the front end portion of the transmission optical module 100 against the contact portions 292 at the time of fitting of the transmission optical module 100 to the transmission receptacle 200, so that damage to the contacts 290 can be avoided.

At the rear end of the base portion 220 along the left convex portion 226, the first projection 227 is formed. This first projection 227 is a projection having a shape of cuboid. And, the height of the first projection 227 from the mounting face 222 is set greater than the height of the convex portion 226 from the mounting face 222. At the rear corner of the upper face of the first projection 227, a C-shaped face 227a is formed. With this, in the course of insertion of the transmission optical module 100 to the transmission receptacle 200, the first cutout 112 will not get hooked to the first projection 227, so that the insertion of the transmission optical module 100 can proceed smoothly. Incidentally, the first projection 227 is an example of the erroneous fitting prevention arrangement.

The arm portions 230 of the main body 210 extend rearwards from the opposed ends of the base portion 220. The inner size therebetween in the right/left direction is approximately same as the width of the transmission optical module 100 in the right/left direction. With this arrangement, the arm portions 230 come into contact with the left and right lateral faces of the transmission optical module 100 thus holding this transmission optical module 100. The vertical height of the arm portions 230 is set higher than the fixed face 224. Further, the arm portions 230 include a pair of first pawl portions 232, second pawl portions 234 and elastic mechanisms 236 all projecting inwards in the vicinity of the extension ends thereof.

The first pawl portion 232 is a projection in the form of a pawl projecting inwards from the upper face side of the arm portion 230. Under the fitted state, as lower faces of the first pawl portions 232 come into contact with the left and right end portions of the upper face of the transmission optical module 100, the angular orientation of the transmission optical module 100 is maintained horizontal and floating displacement thereof is prevented. Further, the upper face of the first pawl portion 232 includes a guide face 233 formed with downward inclination toward the inner side.

The second pawl portion 234 is formed at the rear end of the arm portion 230 to project inwards from the upper end to the lower end. Further, this second pawl portion 234 is configured such that under the fitted state, the front ends of the third cutout 116 and the fourth cutout 118 of the transmission optical module 100 come into contact with this second pawl portion 234. With this arrangement, the transmission optical module 100 is fixed at its appropriate position and also rearward displacement thereof is effectively restricted, thus preventing inadvertent detachment of the transmission optical module 100.

Further, from the lower face of the second pawl portions 234, the pair of elastic mechanisms 236 are provided to extend inwards. On the upper face of the elastic mechanism 236, an abutment portion 237 is formed to project therefrom. Under the fitted state, the abutment portion 237 comes into abutment with the lower face of the transmission optical module 100, whereby the elastic mechanism 236 will be elastically deformed downwards. With this arrangement, for releasing the fitted state by spreading the arm portions 230 away from each other, elastic resilient forces of the elastic mechanisms 236 are applied to the transmission optical module 100, as being effective in the upward direction, so that this transmission optical module 100 can be detached from the transmission receptacle 200 smoothly.

To the main body 210, the cover body 250 formed of metal is attached for its reinforcement. The cover body 250 includes a base cover 260 coming into contact with the fixed face 224 of the main body 210, arm covers 270 extending rearwards from the base cover 260 to come into contact with the outer faces of the arm portions 230, and first hold-down portions 280 provided to extend outwards from the lower end of the front ends of the lateral faces of the base cover 260. The cover body 250 is attached by being inserted from the front side to the rear side of the main body 210 until it comes contact with the front end of the arm portion 230, after press-in of the contacts 290 into the main body 210. When the arm portions 230 are spread apart in the right/left direction, the arm covers 270 are moved together with the arm portions 230.

Figure 5:
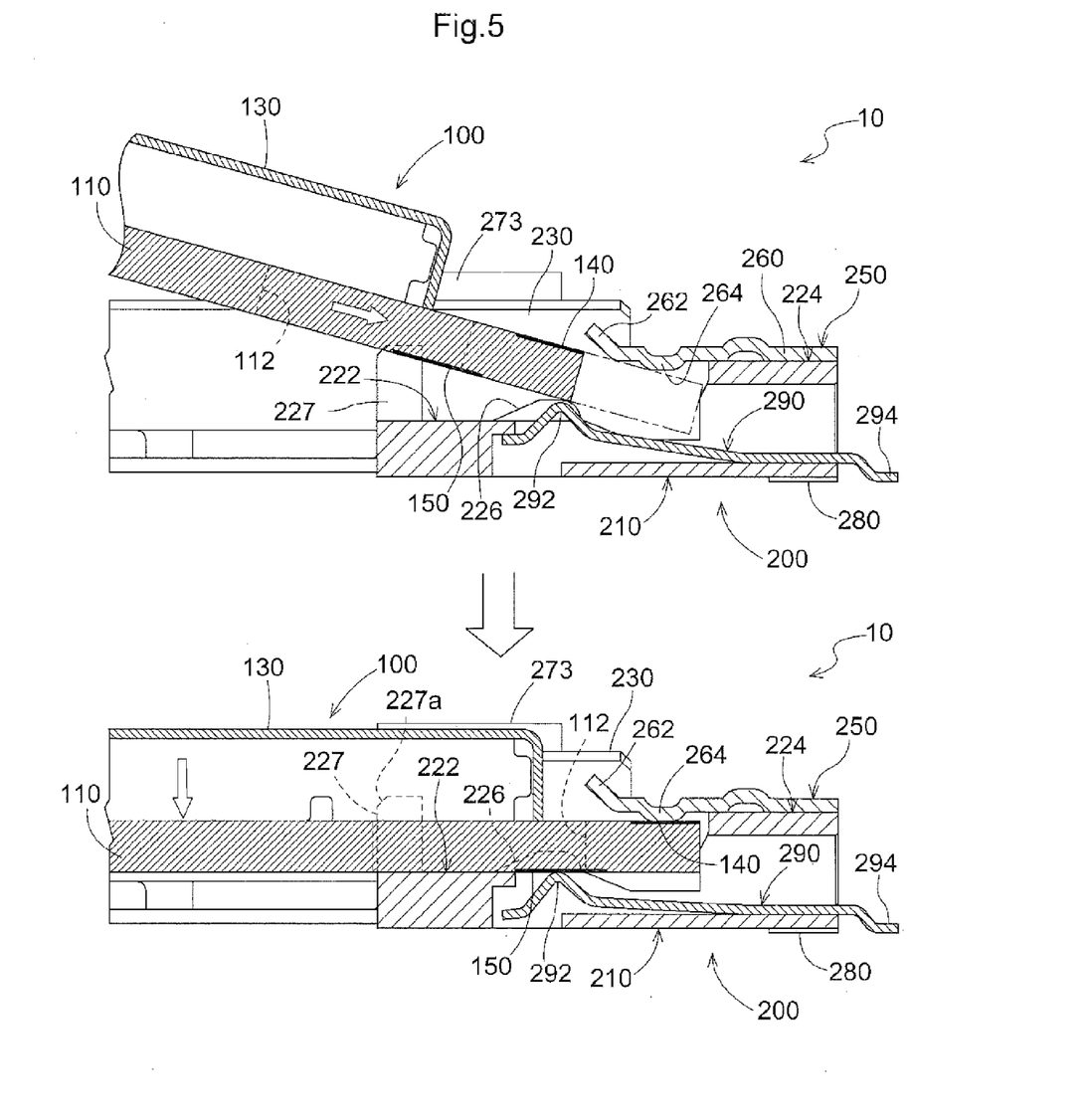

The base cover 260, as shown in FIG. 4 and FIG. 5, includes an insertion guiding portion 262 and a plurality of connecting portions 264. The insertion guiding portion 262 is formed to extend obliquely upwards from the rear end of the base cover 260. With insertion of the upper face of the transmission optical module 100 along the lower face of the insertion guiding portion 262, the transmission optical module can be guided with keeping the angle of insertion lower than a predetermined angle.

As shown in FIG. 5, the plurality of connecting portions 264 project from the lower face of the base cover 260. These connecting portions 264, under the fitted state, come into contact with the ground electrode 140 formed on the upper face of the transmission optical module 100, thereby grounding this transmission optical module 100.

The first hold-down portions 280 extend outwards from the lower end of the rear ends of the lateral faces of the base cover 260. By fixing the first hold-down portions 280 and second hold-down portions 282 to be described later to the mounting substrate 410 by means of e.g. soldering, the fixation of the transmission receptacle 200 to the mounting substrate 410 is reinforced so that an external force will not be transmitted to the terminal portions 294 when such external force is applied to the transmission receptacle 200.

The pair of arm covers 270 are formed integral with the base cover 260 so as to extend rearwards from the opposed ends of the base cover 260. Each arm cover 270 includes a first lateral wall 271, a second lateral wall 272, a folded portion 273, a bent portion 274, a bottom portion 275, an opening restricting portion 276, a first pawl cover 277, a second pawl cover 278 and the second hold-down portion 282.

The first lateral wall 271 extends rearwards from the lateral face of the base cover 260. And, the folded portion 273 is formed by folding a predetermined length of upward extension by 180 degrees outwards from a position spaced apart by a predetermined distance from the rear end of the base cover 260. With formation of this folded portion 273, the strength of the arm cover 270 can be increased. With this, displacement of the arm cover 270 in association with opening (spreading)/closing of the arm portion 230 occurs about the folded portion 273 as the "pivot", so that it is possible to prevent a force generated in association with opening/closing of the arm portion 230 from being applied to the base portion 220. Consequently, inadvertent detachment of the terminal portions 294 of the contacts 290 of the transmission receptacle 200 from the mounting substrate 410 can be prevented.

Further, the arm cover 270 includes the second lateral wall 272 extending further rearwards from the folded portion 273. And, between the folded portion 273 and the second lateral wall 272, the bent portion 274 is formed. With this, the inner distance between the opposed first lateral walls 271 is made equal to the inner distance between the opposed second lateral walls 272.

Adjacent the rear end of the second lateral wall 272, end portions of the upper end are bent inwards, thereby forming the first pawl cover 277 protecting the guide face 233 of the first pawl portion 232 and the second pawl cover 278 protecting the second pawl portion 234. The first pawl cover 277 and the second pawl cover 278 come into contact with the guide face 233 and the upper face of the second pawl portion 234 respectively, thus protecting the first pawl portion 232 and the second pawl portion 234.

The bottom portion 275 of the arm cover 270 is bent inwards from the lower ends of the first lateral wall 271 and the folded portion 273 to extend further rearwards. Further, at the rear end of the bottom portion 275, there is formed the second hold-down portion 282 extending under the second lateral wall 272 and then extending obliquely downwards on the outer side thereof. By fixing the second hold-down portions 282 to the mounting substrate 410 by e.g. soldering, the fixation of the transmission receptacle 200 to the mounting substrate 410 can be made even stronger.

Moreover, around the second hold-down portion 282 of the bottom portion 275, there is provided the opening restricting portion 276 which extends, from a position spaced apart by predetermined lengths from the front/rear opposed ends of the second hold-down portion 282, under the second lateral wall 272 to the outer side and then bent upwards at a position spaced apart by a predetermined distance from the second lateral wall 272. The lower face of the opening restricting portion 276 is located higher than the lower face of the second hold-down portion 282, so as not to interfere with fixation of the second hold-down portion 282. The opening restricting portion 276 is configured such that the arm cover 270 comes into contact with this portion 276 when the arm portion 230 is opened (spread) by an angle greater than a certain angle, thereby to restrict further spreading of the arm portion 230. Therefore, damage to the arm portion 230 and the arm cover 270 due to excessive spreading (opening) of the arm portion 230 can be prevented. Further, since the second hold-down portion 282 is provided downwardly of the opening restricting portion 276, the opening restricting portion 276 will not be deformed even when the arm cover 270 comes into contact with the opening restricting portion 276 to apply a force thereto.

[Fitting Between Transmission Optical Module and Transmission Receptacle]

Next, there will be explained a procedure of fitting the transmission optical module 100 to the transmission receptacle 200. When the transmission optical module 100 is to be inserted to the transmission receptacle 200, as shown in the upper-stage view in FIG. 5, the front end of the lower face of the transmission optical module 100 is brought into contact with the upper end of the convex portion 226. With this, the transmission optical module 100 can be inserted by an angle greater than a predetermined angle. And, after the transmission optical module 100 has been inserted until it comes into contact with the wall face forming the level difference between the mounting face 222 and the fixed face 224, the transmission optical module 100 is pressed down.

In this, the lower face of the substrate 110 of the transmission optical module 100 comes into contact with the guide face 233 of the first pawl portion 232 and presses this face, whereby the arm portion 230 is opened (spread apart) to the outer side (the right/left direction) by a force pushing down the transmission optical module 100. And, as the substrate 110 moves past the first pawl portion 232, this first pawl portion 232 returns to its original position. With this, as shown in the lower-stage view in FIG. 5, fitting of the transmission optical module 100 to the transmission receptacle 200 is completed (fitted state). Under this fitted state, as shown in FIG. 2 and FIG. 6, the convex portion 226 and the first projection 227 on the left side are fitted in the first cutout 112, whereas the convex portion 226 on the right side is fitted in the second cutout 114. Further, the second pawl portion 234 is engaged in the third cutout 116 and the fourth cutout 118.

As described above, since the first pawl portion 232 and the second pawl portion 234 are provided in the transmission receptacle 200, the transmission optical module 100 will not move in either vertical direction or the front/rear direction, under the fitted state. Therefore, the transmission optical module 100 can be fixed to the transmission receptacle 200 in a reliable manner.

As shown in the lower-stage view in FIG. 5, under the fitted condition of the transmission optical module 100 and the transmission receptacle 200, the signal electrodes 150 and the contact portions 292 are placed in contact with each other, so that electric signals inputted from the terminal portions 294 of the transmission receptacle 200 are inputted to the transmission optical module 100 via the contact portions 292 and the signal electrodes 150. Each inputted electric signal is converted into an optical signal by the light projecting element and emitted therefrom. The optical signal is then reflected by the reflection mirror and then enters the core of the optical fiber to be propagated inside the core.

[Configurations of Reception Optical Module and Reception Receptacle]

Figure 7:
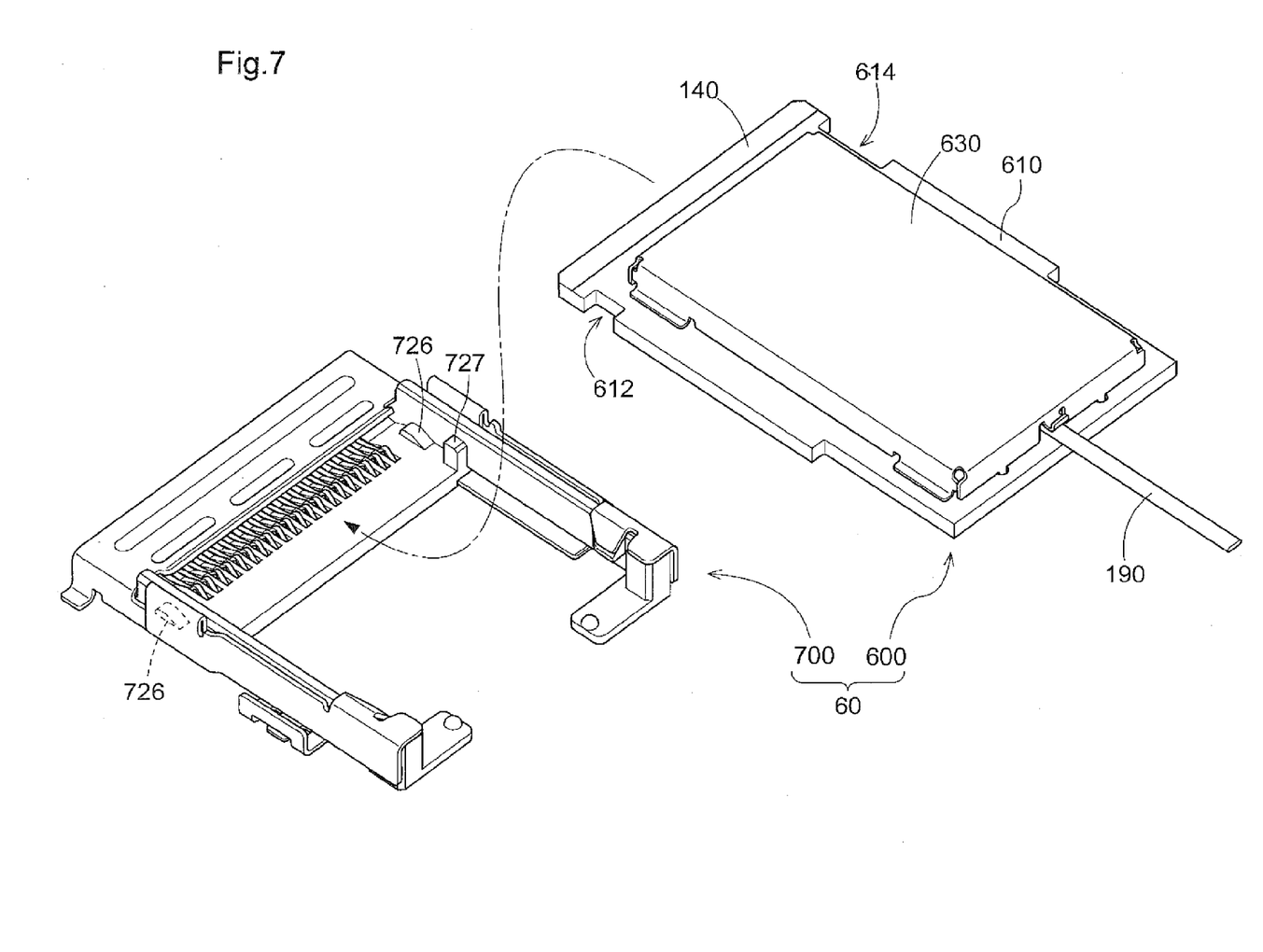
FIG. 7 is a perspective view showing configuration of a reception optical module and a reception receptacle together constituting a reception connector relating to an embodiment.

Next, configuration of a reception connector 60 consisting of a reception optical module 600 and a reception receptacle 700 will be described in details with reference to the accompanying drawings. In the following, the configurations of the reception optical module 600 and the reception receptacle 700 will be explained, only respecting portions thereof different from the transmission optical module 100 and the transmission receptacle 200, and explanation of the same portions will be omitted As shown in FIG. 7, the reception optical module 600 includes a substrate 610 on which a wiring pattern (not shown) is formed, a reflecting mirror (not shown) for reflecting an optical signal emitted from the core of the optical fibers of the optical cable 190, a light reception element (not shown) receiving the reflected optical signal and converting it into an electric signal, a transimpedance amplifier (not shown) for amplifying the converted electric signal, and a cover 630 bonded to the upper face of the substrate 610 and covering the light reception element, the transimpedance amplifier, etc. Further, on the left side of a portion slightly rearwardly of the front end of the substrate 610, a first cutout 612 is formed, and on the right side of the same, a second cutout 614 is formed. The lengths of cutouts (lengths in the front/rear direction) of the first cutout 612 and the second cutout 614, unlike the transmission optical module 100, are such that the second cutout 614 is cut out longer to the rear side than the first cutout 612. Incidentally, the first cutout 612 and the second cutout 614 are an example of the erroneous fitting prevention arrangement.

The outer appearance (shape) of the reception optical module 600 is same as that of the transmission optical module 100, except that the size of the first cutout 612 and the second cutout 614 are different from those of the first cutout 112 and the second cutout 114 respectively. Accordingly, with the above-described configuration, it is possible to co-use a production facility for the transmission optical module 100 and the reception optical module 600, so that the transmission optical module 100 and the reception optical module 600 can be manufactured economically.

Figure 8:
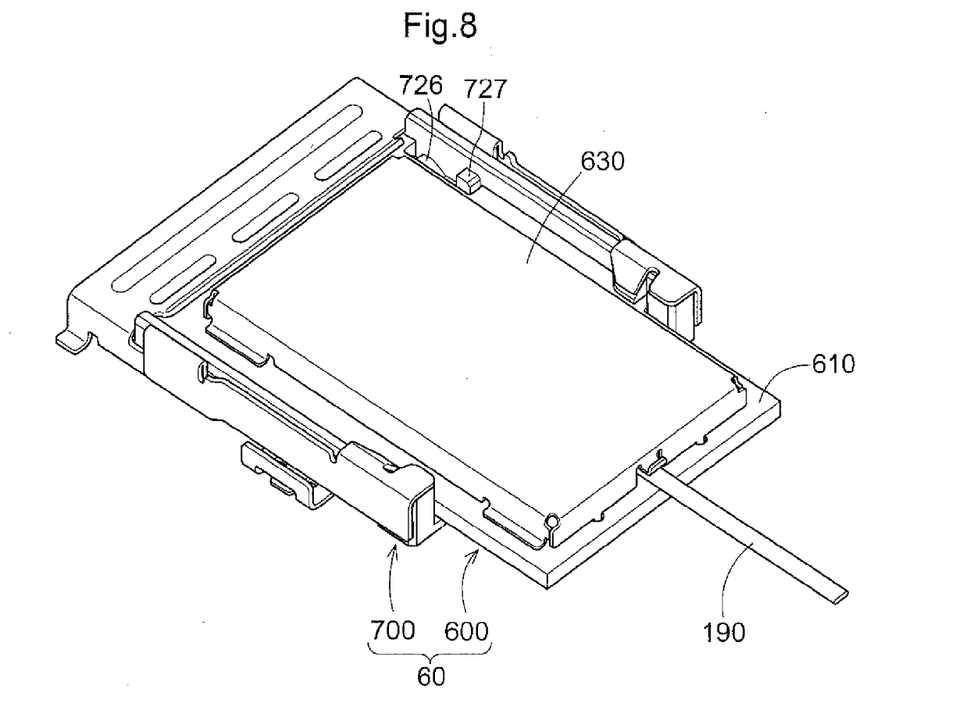
FIG. 8 is a perspective view showing a state wherein the reception optical module and the reception receptacle are fitted to each other.
Figure 9:
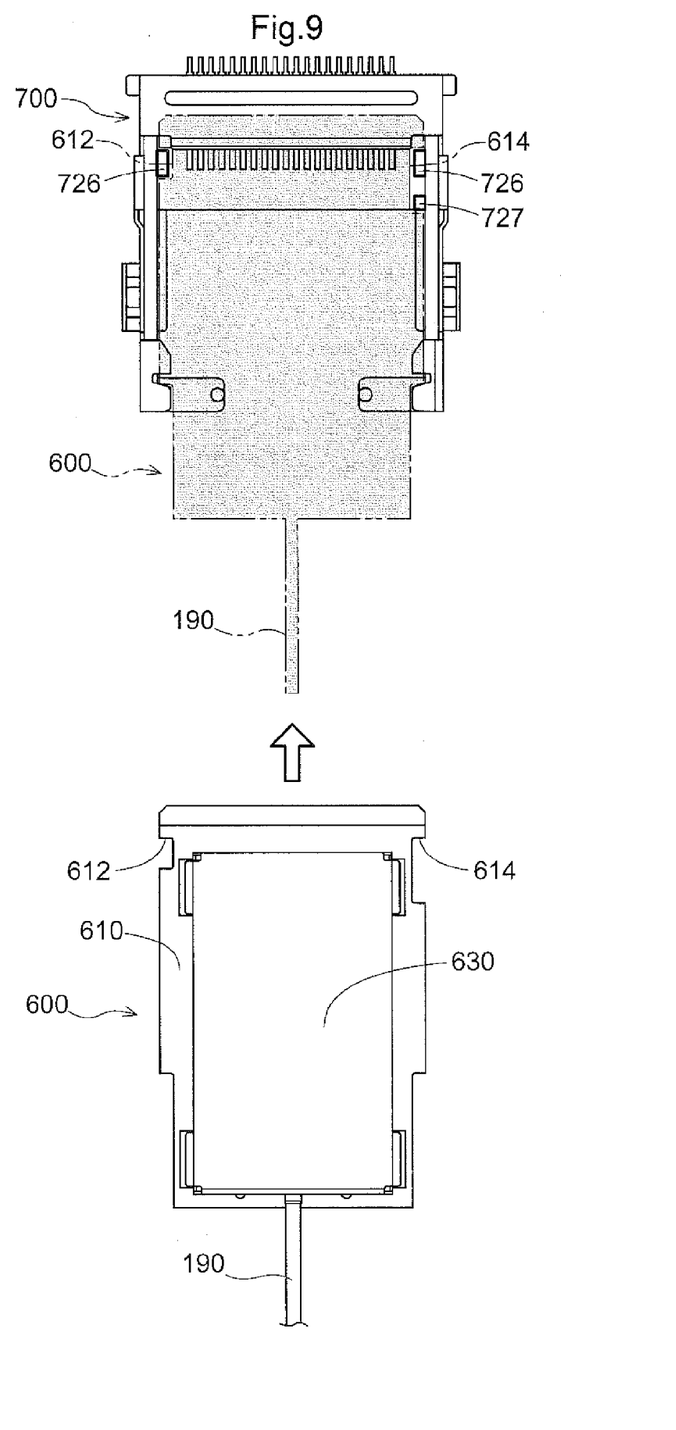
FIG. 9 is a plan view showing positional relation of a convex portion relative to a first cutout as well as positional relation of another convex portion and a second projection relative respectively to between a second cutout, when the reception optical module has been fitted to the reception receptacle.

In the reception receptacle 700, unlike the transmission receptacle 200, the first projection 227 is not formed on the left side, but a second projection 727 of the same size as the first projection 227 is formed on the right side. With this, under the fitted state of the reception optical module 600 and the reception receptacle 700, as shown in FIG. 8 and FIG. 9, a convex portion 726 on the left side is fitted in the first cutout 612, and a right convex portion 726 and the second projection 727 are fitted in the second cutout 614. Incidentally, the second projection 727 is an example of the erroneous fitting prevention arrangement.

The outer appearance (shape) of the reception receptacle 700 is same as that of the transmission receptacle 200, except that the position of the second projection 727 is different from the position of the first projection 227 of the transmission receptacle 200. Accordingly, with the above-described configuration, it is possible to co-use a production facility for the transmission receptacle 200 and the reception receptacle 700, so that the transmission receptacle 200 and the reception receptacle 700 can be manufactured economically.

As described above, the transmission optical module 100 and the reception optical module 600 differ from each other in the respect of the positions where the front/rear elongate cutouts are formed therein. Namely, in the transmission optical module 100, the first cutout 112 on the left side is formed longer than the second cutout 114, whereas in the reception optical module 600, the second cutout 614 on the right side is formed longer than the second cutout 114 and the first cutout 612, respectively. Further, in correspondence therewith, in the transmission receptacle 200, the first projection 227 is formed on the left side. Whereas, in the reception receptacle 700, the second projection 727 is formed on the right side. With these arrangements, the transmission optical module 100 can be fitted with the transmission receptacle 200; and the reception optical module 600 can be fitted with the reception receptacle 700, respectively.

However, even when an attempt is made to fit the reception optical module 600 to the transmission receptacle 200 erroneously, the first projection 227 will come into contact with the lower face of the substrate 610 of the reception optical module 600 and cannot be fitted into the first cutout 612. Therefore, the reception optical module 600 cannot be fitted to the transmission receptacle 200. Similarly, even when an attempt is made to fit the transmission optical module 100 to the reception receptacle 700 erroneously, the second projection 727 will come into contact with the lower face of the substrate 110 of the transmission optical module 100 and cannot be fitted into the second cutout 114. Therefore, the transmission optical module 100 cannot be fitted to the reception receptacle 700.

Since both the first projection 227 and the second projection 727 are formed in the vicinity of the contacts 290 and also the heights of the first projection 227 and the second projection 727 as measured from the mounting face 222 are greater than the height of the contact portions 292 from the mounting face 222, even if the above-described erroneous fitting occurred, this would be recognized as erroneous fitting prior to establishment of electric contact by the contact between the signal electrodes 150 and the contacts 290. Therefore, it is possible to prevent damage through erroneous power supply to the electronic devices such as the light projecting element ,the light receiving element, etc. mounted on the transmission optical module 100 or the reception optical module 600 as a result of erroneous insertion.

In this way, through the simple arrangement of making the forming positions of projections and the sizes of the cutouts different from each other between the transmission connector 10 and the reception connector 60, erroneous fitting can be prevented effectively.

Figure 10:
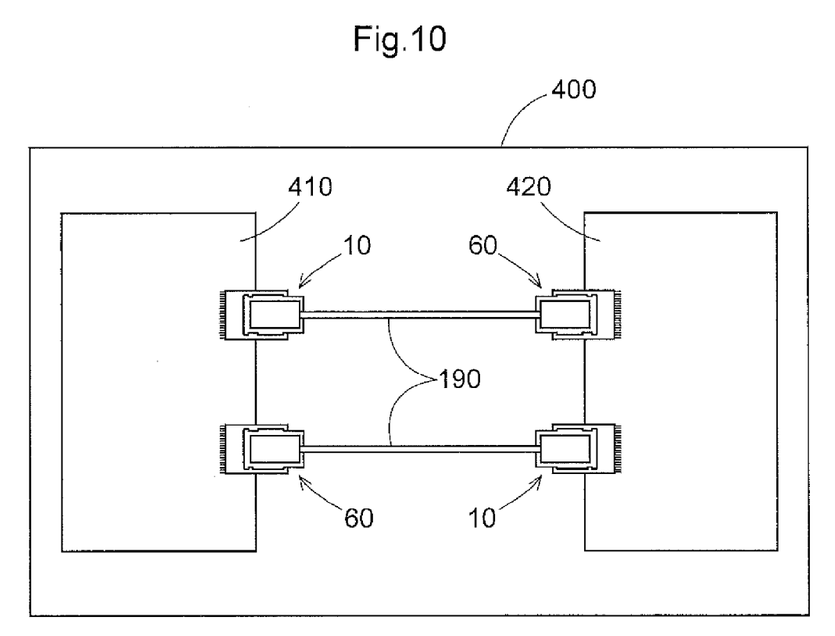
FIG. 10 is a schematic diagram showing a state in which the transmission connector and the reception connector are connected to optical cables and are used in an electronic device.

As shown in FIG. 10, the transmission connector 10 and the reception connector 60 are mounted respectively on the mounting substrates 410, 420 disposed inside an electronic device 400 and these respective transmission connector 10 and the reception connector 60 are connected to optical cables 190. More particularly, the transmission connector 10 mounted on the mounting substrate 410 is connected via the optical cable 190 to the reception connector 60 mounted on the mounting substrate 420, whereas the transmission connector 10 mounted on the mounting substrate 420 is connected via the optical cable 190 to the reception connector 60 mounted on the mounting substrate 410. This configuration of the transmission optical module 100 and the reception optical module 600 being connected to opposed ends of the optical cables 190 constitutes a one-way transmission type active optical cable. With this, electric signals can be converted into optical signals between the mounting substrate 410 and the mounting substrate 420 and the optical signals can be transmitted at a high speed with using the optical fibers.

In FIG. 10, there was explained an embodiment wherein an active optical cable was employed inside the electronic device 400. Needless to say, an active optical cable can be used between different electronic devices.

The invention claimed is:

1. A connector comprising:
a transmission optical module having a plurality of signal electrodes each inputting an electric signal; and
a transmission receptacle having a plurality of contacts to be electrically directly connected to the respective signal electrodes when fitted to the transmission optical module,
wherein the transmission optical module is in a rectangular shape as viewed from the top and has a first side and a second side both extending in parallel in a direction orthogonal to an arrangement direction of the signal electrodes, and a cutout is formed in the first side,
the transmission receptacle includes a projection fitted in the cutout when the transmission optical module is fitted to the transmission receptacle,
the transmission optical module does not have a cutout in a portion of the second side, said portion corresponding to a portion of the cutout in which the projection is fitted, and
the connector further comprises an erroneous fitting prevention arrangement preventing erroneous fitting of a reception optical module to the transmission receptacle when the projection is brought into contact with a portion other than a cutout of the reception optical module.

2. The connector according to claim 1, wherein the cutout of the transmission optical module is formed adjacent the signal electrodes, and the projection is formed adjacent the contacts; and a height of the projection from a mounting face on which the projection is mounted is greater than a height of a contact point of the contacts from the mounting face.

3. An electronic device, wherein the electric device converts the electric signal into an optical signal and transmits this optical, signal using the connector according to claim 1.

4. An electronic device, wherein the electric device converts the electric signal into an optical signal and transmits this optical signal using the connector according to claim 2.

5. A connector comprising:
a reception optical module having plurality of signal electrodes each outputting an electric signal; and
a reception receptacle having a plurality of contacts to be electrically directly connected to the respective signal electrodes when fitted to the reception optical module,
wherein the reception optical module is in a rectangular shape as viewed from the top and has a first side and a second side both extending in parallel in a direction orthogonal to an arrangement direction of the signal electrodes, and a cutout is formed in the second side,
the reception receptacle includes a projection fitted in the cutout when the reception optical module is fitted to the reception receptacle,
the reception optical module does not have a cutout in a portion of the first side, said portion corresponding to a portion of the cutout in which the projection is fitted, and
the connector further comprises an erroneous fitting prevention arrangement preventing erroneous fitting of a transmission optical module to the reception receptacle when the projection is brought into contact with a portion other than a cutout of the transmission optical module.

6. The connector according to claim 5, wherein the cutout is formed adjacent the signal electrodes, and the projection is formed adjacent the contacts, and a height of the projection from a mounting face on which the projection is mounted is greater than a height of a contact point of the contacts from the mounting face.

7. An electronic device, wherein the electric device converts an optical signal into the electric signal and receives this electric signal, using the connector according to claim 5.

8. An electronic device, wherein the electric device converts an optical signal into the electric signal and receives this electric signal, using the connector according to claim 6.

9. An active optical cable comprising:
a transmission receptacle having a plurality of transmission contacts each outputting an electric signal for transmission input from outside;
a transmission optical module which has a plurality of signal electrodes for transmission to be electrically directly connected to the respective transmission contacts when fitted to the transmission receptacle, and converts the electric signal for transmission input from the transmission receptacle into an optical signal, and transmits this optical signal;
an optical cable which is connected to the transmission optical module and transmits the optical signal from the transmission optical module;
a reception optical module which is connected to the optical cable and receives the optical signal transmitted through the optical cable and converts this optical signal into an electric signal for reception, and the reception optical module also has a plurality of signal electrodes for reception each outputting the electric signal for reception; and
a reception receptacle having a plurality of reception contacts to be electrically directly connected to the respective signal electrodes for reception when fitted to the reception optical module, and outputting, from the reception contacts to outside, the electric signal for reception input from the reception optical module,
wherein the transmission optical module is in a rectangular shape as viewed from the top and has a first side and a second side both extending in parallel in a direction orthogonal to an arrangement direction of the signal electrodes, and a first cutout is formed in the first side,
the transmission receptacle includes a first projection fitted in the first cutout when the transmission optical module is fitted to the transmission receptacle,
the transmission optical module does not have a cutout in a portion of the second side, said portion corresponding to a portion of the first cutout in which the first projection is fitted,
the reception optical module is in a rectangular shape as viewed from the top and has a third side and a fourth side both extending in parallel in a direction orthogonal to an arrangement direction of the signal electrodes for reception, and a second cutout is formed in the fourth side,
the reception receptacle includes a second projection fitted in the second cutout when the reception optical module is fitted to the reception receptacle,
the reception optical module does not have a cutout in a portion of the third side, said portion corresponding to a portion of the second cutout in which the second projection is fitted, and
the optical cable further comprises an erroneous fitting prevention arrangement preventing erroneous fitting of the transmission optical module to the reception receptacle when the second projection is brought into contact with a portion of the second side other than the cutout of the transmission optical module, and preventing erroneous fitting of the reception optical module to the transmission receptacle when the first projection is brought into contact with a portion of the third side other than the cutout of the reception optical module.

10. The active optical cable according to claim 9, wherein the transmission optical module and the reception optical module have the same outer appearances, except for the first cutout and the second cutout; and the transmission receptacle and the reception receptacle have the same outer appearances, except for the first projection and the second projection.

11. An electronic device, wherein the electric device converts the electric signal for transmission into the optical signal and transmits this optical signal, and the electric device also converts the optical signal into the electric signal for reception and receives this electric signal, using the active optical cable according to claim 9.

12. (Previously Present) An electronic device, wherein the electric device converts the electric signal for transmission into the optical signal and transmits this optical signal, and the electric device also converts the optical signal into the electric signal for reception and receives this electric signal, using the active optical cable according to claim 10.

* * * * *

UNITED STATES PATENT AND TRADEMARK OFFICE
CERTIFICATE OF CORRECTION

PATENT NO.        : 9,547,135 B2
APPLICATION NO.   : 14/682469
DATED             : January 17, 2017
INVENTOR(S)       : Kosuke Sasada et al.

It is certified that error appears in the above-identified patent and that said Letters Patent is hereby corrected as shown below:

In the Claims

Column 12, Line 40, Claim 3, delete "optical, signal" and insert -- optical signal, --

Column 12, Line 45, Claim 5, after "having" insert -- a --

Column 14, Line 41, Claim 12, before "An" delete "(Previously Present)"

Signed and Sealed this
Eleventh Day of April, 2017

Michelle K. Lee
*Director of the United States Patent and Trademark Office*